United States Patent

Penz et al.

[11] Patent Number: 5,888,913
[45] Date of Patent: Mar. 30, 1999

[54] GLASS MATT REINFORCED THERMOPLASTICS SUITABLE FOR THE PRODUCTION OF PAINTABLE PARTS AND PARTS PRODUCED THEREFROM

[75] Inventors: Wolfgang Penz, Unterweitersdorf; Wolfram Stadlbauer, Linz; Wilfried Blauhut; Wolfgang Stockreiter, both of Linz; Ernst Zopf, St. Georgen; Manfred Lehner, Pasching, all of Austria

[73] Assignee: Borealis AG, Austria

[21] Appl. No.: 812,954

[22] Filed: Mar. 5, 1997

[30] Foreign Application Priority Data

Mar. 5, 1996 [AT] Austria ................ 408/96

[51] Int. Cl.$^6$ ................ B32B 5/02
[52] U.S. Cl. ........ 442/180; 428/304.4; 428/311.11; 428/221; 428/297.4; 442/65; 442/70; 442/76; 442/77; 442/172; 264/41; 264/112; 264/230; 264/253; 264/320; 264/324
[58] Field of Search ............ 428/304.4, 311.11, 428/221, 297.4; 442/70, 65, 76, 77, 172, 180; 264/41, 112, 230, 253, 320, 324

[56] References Cited

U.S. PATENT DOCUMENTS

| | | |
|---|---|---|
| 4,118,533 | 10/1978 | Hipchen et al. . |
| 4,146,528 | 3/1979 | Theysohn et al. . |
| 4,284,683 | 8/1981 | Hipchen et al. . |
| 4,346,133 | 8/1982 | Hipchen et al. . |
| 4,386,983 | 6/1983 | Hipchen et al. . |
| 5,341,561 | 8/1994 | Schorm et al. . |

FOREIGN PATENT DOCUMENTS

| | | |
|---|---|---|
| 0 378 854 | 7/1990 | European Pat. Off. . |
| 1451824 | 10/1976 | United Kingdom . |

OTHER PUBLICATIONS

*Chemical Abstracts*, vol. 116, abstract No. 116:236997v(1992).
*Chemical Abstracts*, vol. 85, abstract No. 85:34096f(1976).
*Chemical Abstracts*, vol. 124, No. 22, abstract No. 124:291803u(1996).
*Chemical Abstracts*, vol. 106, abstracts No. 106:139412m(1987).
*Chemical Abstracts*, vol. 106, abstract No.106:103494a(1987).

*Primary Examiner*—Richard Weisberger
*Attorney, Agent, or Firm*—Wenderoth, Lind & Ponack, L.L.P.

[57] ABSTRACT

Glass matt reinforced thermoplastics suitable for the production of paintable parts, comprising a) a thermoplastic matrix polymer of a viscosity under processing conditions corresponding to a melt flow index (MFI 230/2.16) of polypropylene of at least 250 g/10 min and b) one or more glass matts which, upon heating, bring about an expansion of the glass matt reinforced thermoplastics to at least 2.5 times the original thickness, optionally in combination with c) an addition of fine-particle, mineral fillers.

12 Claims, No Drawings

GLASS MATT REINFORCED THERMOPLASTICS SUITABLE FOR THE PRODUCTION OF PAINTABLE PARTS AND PARTS PRODUCED THEREFROM

Glass matt reinforced thermoplastics suitable for the production of paintable parts and parts produced therefrom Glass matt reinforced thermoplastics (GMTs) are of increasing interest in many branches of industry, specifically in the automotive industry. In such cases, GMTs are preferably processed by the flow molding process, by which even complicated parts can be produced with short cycle times in just a single molding operation. However, currently only parts which are not in the visible area are produced from GMTs by means of the flow molding process, i.e., neither parts for interior paneling nor exterior paneling, since the appearance of the parts thus produced does not meet requirements. Until now, the production of a surface equivalent to a painted steel sheet has failed on account of two problems, to be specific, so-called surface defects and inadequate paint adhesion.

In contrast to GMT fabricated by forming processes, it is not possible with GMT processed by flow molding to pre-fabricate a layer structure with a glass-free surface in the semi-finished product and retain it during molding of the finished part. The reason for this is that, in flow molding, heated GMT, i.e., an "insert" which has a much smaller surface but greater thickness than the finished part, is placed into a cold or moderately heated mold and distributed by the molding pressure by flowing in the mold. Any surface layers would be destroyed in this process. It is consequently unavoidable that the surface of the molding consists of the same GMT as in the rest of the molding, so that problems with glass fibers protruding out of the surface arise when building up the layer of paint. Building up a layer of paint is also disturbed by an uneven "orange peel" surface of the molding, which is produced in the case of GMTs known from the prior art by the shrinkage of the matrix polymer during cooling. A further problem for the surface is caused by the sequence of events in the molding operation, in which the insert, heated outside the mold, is placed into the cold or moderately warm mold, the mold is then closed and only at the end of the closing operation is the pressure which brings about the mold-flowing of the GMT built up. For this reason, the surface of the insert is inevitably in contact with the mold for much longer than the rest of the surface of the molding, which only forms during flowing. This has the effect that the two parts of the surface of the molding have a different appearance, known as insert visibility, i.e., until now, with GMTs known from the prior art, it can be seen on the molding where the insert was. One possible way of reducing the insert visibility is to increase the mold temperature. However, this inevitably means longer cooling time for the molding and consequently a reduction in the output, and resultant increased unit costs.

A further quality problem of painted GMT moldings is the adhesion of the paint layer on the molding. This applies in particular to GMT with a polyolefin in as its matrix polymer.

For example, using the current state of the art, the adhesion of a paint layer on GMT with polypropylene as its matrix polymer is unsatisfactory or can be achieved only with high technical expenditure.

The object of the present invention was consequently to find glass matt reinforced thermoplastics with which it is ensured that firstly the building up of a paint layer is not disturbed in any way by glass fibers protruding out of the surface or by an orange peel effect on the molding, secondly that no insert visibility occurs and thirdly that on the painted part satisfactory paint adhesion on the GMT surface is obtained without great expenditure.

Unexpectedly, it has been possible to achieve this object by firstly using matrix polymers of a low viscosity, secondly by using glass matts which, upon heating, bring about an expansion of the GMT produced therewith to at least 2.5 times its original thickness and, optionally, thirdly by additionally using fine-particle, mineral fillers.

Consequently, the subject of the present invention is glass matt reinforced thermoplastics which are suitable for the production of paintable parts and which comprise
   a) a thermoplastic matrix polymer of a viscosity under processing conditions corresponding to a melt flow index (MFI 230/2.16) of polypropylene of at least 250 g/10 min and
   b) one or more glass matts which, upon heating, bring about an expansion of the glass matt reinforced thermoplastics to at least 2.5 times the original thickness, optionally in combination with
   c) an addition of fine-particle, mineral fillers.

Suitable as matrix polymers for the GMTs according to the invention are thermoplastics of a viscosity corresponding to a melt flow index (MFI 230/2.16) of polypropylene (PP) of at least about 250 g/10 min. Preferred are those thermoplastics which have a viscosity which corresponds to an MFI of PP of about 300 to about 1500 g/10 min, particularly preferred of about 500 g/10 min to about 1000 g/10 min. These may be, for example, polyolefins, polyamides, polystyrenes, polycarbonates, polyesters, such as for example polyethylene terephthalate or polybutylene terephthalate, polyether ketones, polyether ether ketones, polyether sulfones, polyether imides, polyphenylene oxide, polyphenylene sulfide or polysulfones or their mixed polymers. It is preferred to use polyolefins, particularly preferred to use polypropylene and its copolymers or mixed polymers such as for instance PP modified with EPDM.

The corresponding matrix polymer is reinforced according to the invention by means of one or more glass matts. The glass matts used are in this case processed such that, on heating, they bring about an expansion of the reinforced thermoplastic to at least 2.5 times the original thickness of the reinforced thermoplastic. It is preferred to achieve an expansion of the GMT to at least 3 times the original thickness.

Glass fiber matts are understood as meaning textile sheet materials composed of glass fibers. The glass fibers may in this case be 10 mm to infinitely long, it being possible for the fibers or filaments to be both in random arrangement and oriented. Fibers of 50 to 250 mm in length are used with preference. To improve the mechanical properties of the finished component, the glass fibers may also contain adhesion promoters, for example based on silane, chromium or titanium. The fiber matts are bonded, for example, by needle-punching or by matt consolidation by means of applying binders. Bonding is preferably performed by means of needle-punching. The glass matts bonded by needle-punching are intended, upon heating, to bring about an expansion of the GMT to at least 2.5 times the original thickness. The precise needle-punching parameters are in this case best determined by preliminary tests; they depend, inter alia, on the type of glass fibers used, their chopped length and surface treatment, the type of nonwoven formation, and on the characteristic geometrical variables of the needle-punching machine.

Furthermore, the needle-punching is to be performed in such a way as to obtain an adequate number of projecting glass fibers, by which a furry surface structure is achieved, whereby the insert visibility is significantly reduced, without the surface of the GMT being disturbed by the protruding glass fibers. This number is dependent here on parameters for the component production, such as for instance the size and shape of the insert and of the finished component.

The ratio of thermoplastic to glass fiber matt is chosen such that the completed semi-finished product contains between 10 and 60% by weight, preferably between 15 and 40% by weight, of glass fibers, based on the GMT. There may be either just one matt impregnated with the polymer melt, or else a plurality of matts lying one on top of the other may be impregnated.

It is also preferred to add to the thermoplastics 2 to 60% by weight, preferably 10 to 40% by weight, of fine-particle mineral fillers. Examples of mineral fillers for this are talc, chalk, barium sulfate.

The particle size of the filler in this case lies between 1 $\mu$m and 100 $\mu$m, preferably between 3 and 50 $\mu$m and particularly preferably between 5 and 30 $\mu$m. However, if a filler is added, it must be ensured that the viscosity of the polymer containing filler does not drop below a value corresponding to an MFI of PP of 250 g/10 min. The viscosity of the polymer containing filler should consequently likewise correspond at least to an MFI of PP of 250 g/10 min, preferably 300 to about 1500 g/10 min, particularly preferably about 500 to about 1000 g/10 min. It must also be ensured that, if a filler is added, the proportion of the glass fiber matt in % by weight does not fall below 10% by weight.

The GMTs according to the invention may be produced in any desired way, for instance in accordance with a process known from the prior art, such as for example described in DE 23 12 816, AT 388.896 etc.

On account of their outstanding surface properties, the GMTs according to the invention are suitable for the production of painted moldings, for example for the automotive industry.

EXAMPLE 1

Glass fiber roving of the type EC 16 2400 from the PPG company was cut on a chopping machine to give a chopped fiber of 4 inches in length, deposited on a conveyor belt as a fiber layer of 620 g/m$^2$ and introduced on said belt into a needle-punching machine of the Fehrer type NL 9S make and needle-punched with 43 punches per cm$^2$ and a needle penetration of 15 mm.

2 of the chopped fiber matts thus produced were fed to a double-belt press of the Held make, arranged one on top of the other in such a way that the needle-emergence sides of the matts faced outward, i.e., that of the upper matt upward and that of the lower matt downward. PP with a melt flow index MFI 230/2.16 of 520 (type YS 80 from the PCD company) was melted in a single-screw extruder of the Reifenhauser type RH 1651 make and, at a melt temperature of 205° C., applied via a slot die onto the lower matt, running to the press at 2 m/min, the upper matt was placed onto the layer of melt and the matt/melt/matt assembly was fed to the double-belt press.

In the press, a pressure of 15 bar was applied to the assembly for a total dwell time of 3 min (including setting). A GMT of 3.7 mm in thickness, a density of 1.12 g/cm$^3$ and a glass content of 30% was obtained. A sample piece of the abovementioned GMT was heated in a radiation stove to 210° C. and, after a dwell time of 7 min, cooled and consequently made to set. The GMT set in the expanded state had a thickness of 15.8 mm.

3 cut-to-size pieces of 240 mm×166 mm of the abovementioned GMT with a weight of 165 g each were heated in the radiation stove in a time of 5 min to 220° C. and pressed together with a pressing force of 2000 KN to form sample parts of 590×250×3 mm. The mold temperature was 62° C. After a holding time of 65 s, the part was removed. The insert was clearly evident visually, and also could be felt slightly, on the impression of the polished mold surface.

The abovementioned parts were treated with 2K Primer and 2K Filler from the Schwab Lacke company and subsequently painted with 2K Topcoat paint from the Sherwin Williams company.

The paint surface was visually satisfactory, i.e., the slightly different surface structure in the region of the insert was covered by the painting.

In the subsequent tests, however, satisfactory results were not achieved. The cross-cut test (in accordance with EN ISO 2409) gave the value Gt 5, i.e., paint adhesion completely unsatisfactory. The VDA stone impact test was not OK.

EXAMPLE 2

GMT was prepared as in Example 1, with the change that 40% of talc A 10 from the Naintsch Mineralwerke GmbH, Graz, company was added to the matrix polymer.

The density of the GMT obtained was 1.40 g/cm$^3$, the glass content was 23.8%. The GMT, set in the expanded state, had a thickness of 15.2 mm.

The insert was just visually evident, but could not be felt, on the impression of the polished mold surface. The abovementioned parts were coated with primer in the same way as in Example 1.

The following were achieved in the tests:

Cross-cut test Gt 0-1, i.e., paint adhesion excellent to very good. Stone impact test OK.

We claimed:

1. Glass matt reinforced thermoplastics suitable for the production of paintable parts, produced by a process which comprises:

molding under conditions of elevated temperature and pressure
   a) a thermoplastic matrix polymer of a viscosity, under such molding conditions, corresponding to a melt flow index (MFI 230/2.16) of polypropylene of at least 250 g/10 min., optionally in combination with fine mineral filler particles, and
   b) one or more glass matts which, upon heating under the above molding conditions, bring about an expansion of the glass matt reinforced thermoplastics to at least 2.5 times the original thickness,
   whereby said glass marts are impregnated with said thermoplastic matrix polymer.

2. The glass matt reinforced thermoplastics as claimed in claim 1, wherein the matrix polymer has a viscosity under said molding conditions corresponding to a melt flow index of polypropylene between 300 and 1500 g/min.

3. The glass matt reinforced thermoplastics as claimed in claim 1, wherein polyolefins, polyamides, polystyrenes, polycarbonates, polyesters, polyether ketones, polyether ether ketones, polyether sulfones, polyether imides, polyphenylene oxide, polyphenylene sulfide or polysulfones or their mixed polymers are used as the matrix polymer.

4. The glass matt reinforced thermoplastics according to claim 1, wherein polypropylene or its copolymers or mixed polymers are used as the matrix polymer.

5. The glass matt reinforced thermoplastics as claimed in claim 1, which contain 10 to 60% by weight of glass matts.

6. The glass matt reinforced thermoplastics as claimed in claim 1, wherein the glass matts are composed of glass fibers which may be between 10 mm and infinitely long.

7. The glass matt reinforced thermoplastics as claimed in claim 1, wherein the glass matts are bonded by needle-punching.

8. The glass matt reinforced thermoplastics as claimed in claim 1, wherein they contain 2 to 60% by weight of fine-particle mineral fillers.

9. The glass matt reinforced thermoplastics as claimed in claim 8, wherein the particle size of the fillers is 1 $\mu$m to 100 $\mu$m.

10. The glass matt reinforced thermoplastics as claimed in claim 8, wherein talc, chalk or barium sulfate are used as fillers.

11. The glass matt reinforced thermoplastics as claimed in claim 1, wherein the thermoplastic matrix polymer is introduced between two or more glass matts before molding.

12. The glass matt reinforced thermoplastics as claimed in claim 1, wherein one or more glass matts lying on top of each other are impregnated with said thermoplastic matrix polymer.

* * * * *